(12) United States Patent
Kondo

(10) Patent No.: US 7,738,141 B2
(45) Date of Patent: Jun. 15, 2010

(54) IMAGE PROCESSING DEVICE THAT PROCESSES COLOR IMAGE DATA

(75) Inventor: Masaki Kondo, Toyoake (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 321 days.

(21) Appl. No.: 11/509,761

(22) Filed: Aug. 25, 2006

(65) Prior Publication Data

US 2007/0047032 A1 Mar. 1, 2007

(30) Foreign Application Priority Data

Aug. 26, 2005 (JP) ............................. 2005-245286

(51) Int. Cl.
*G06F 15/00* (2006.01)
(52) U.S. Cl. ...................... 358/1.9; 358/518
(58) Field of Classification Search ................. 358/518, 358/1.9
See application file for complete search history.

(56) References Cited

U.S. PATENT DOCUMENTS

| | | | |
|---|---|---|---|
| 6,057,946 A | 5/2000 | Ikeda et al. | |
| 6,587,735 B1* | 7/2003 | Yaguchi | 700/2 |
| 6,643,398 B2* | 11/2003 | Moriwaki | 382/167 |
| 6,731,400 B1* | 5/2004 | Nakamura et al. | 358/1.9 |
| 6,912,064 B1 | 6/2005 | Fujita | |
| 7,123,391 B2 | 10/2006 | Saito | |
| 7,199,897 B2* | 4/2007 | Nomizu | 358/1.18 |
| 2003/0048476 A1* | 3/2003 | Yamakawa | 358/3.1 |
| 2004/0234135 A1* | 11/2004 | Nomizu | 382/209 |
| 2005/0254076 A1* | 11/2005 | Mimamino | 358/1.9 |
| 2005/0280852 A1* | 12/2005 | Namizuka | 358/1.9 |

FOREIGN PATENT DOCUMENTS

| | | |
|---|---|---|
| JP | 63-304773 | 12/1988 |
| JP | 9-261469 | 10/1997 |
| JP | 10-191053 | 7/1998 |
| JP | 2000-56525 | 2/2000 |
| JP | 2003-110864 | 4/2003 |

OTHER PUBLICATIONS

Japanese Office Action, with Partial English Translation, issued in Japanese Patent application No. 2005-245286, dated on Jan. 22, 2008.

\* cited by examiner

*Primary Examiner*—Twyler L Haskins
*Assistant Examiner*—Michael Burleson
(74) *Attorney, Agent, or Firm*—McDermott Will & Emery LLP

(57) ABSTRACT

A printing unit prints an image based on print data. The printing unit has characteristics. An input-color-data storing portion stores input color data indicative of colors of inputted image data. The input color data have color component values of a first color group. A print-data generating portion converts the color component values of the first color group stored in the input-color-data storing portion into color component values of a second color group, thereby generating pre-correction print data having a predetermined bit width. A correcting portion converts the pre-correction print data into post-correction print data that is adapted to the characteristics of the printing unit. The correcting portion includes a bit-width correcting portion that generates the post-correction print data having a bit width greater than the predetermined bit width. The bit-width correcting portion selectively increases the bit width based on predetermined criteria.

23 Claims, 7 Drawing Sheets

FIG.1
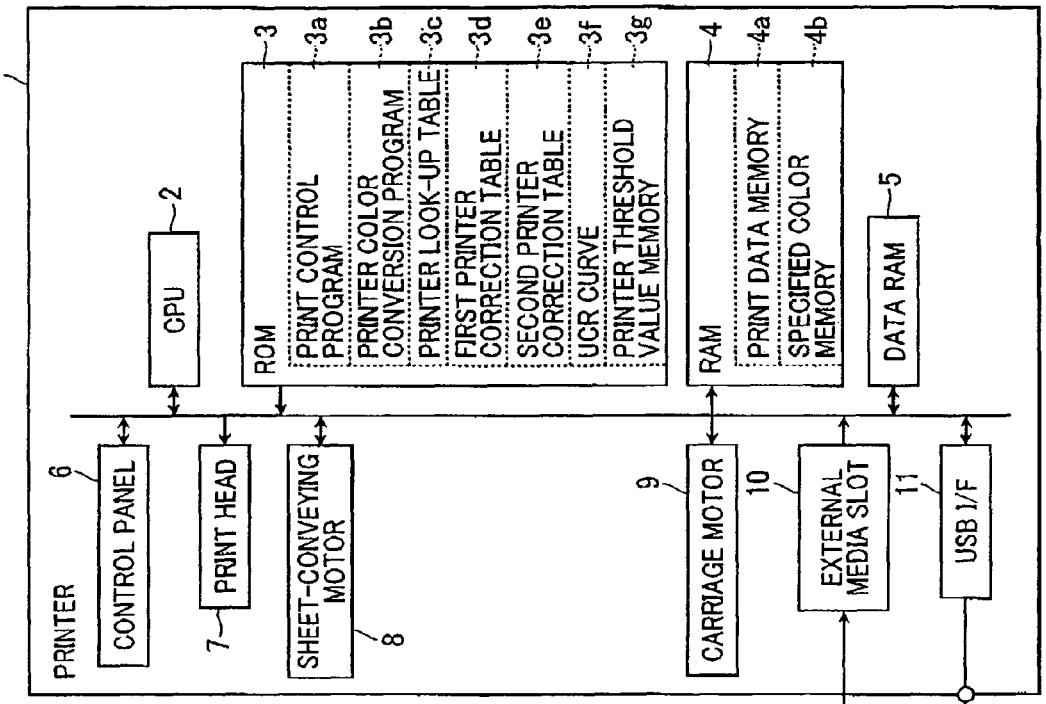
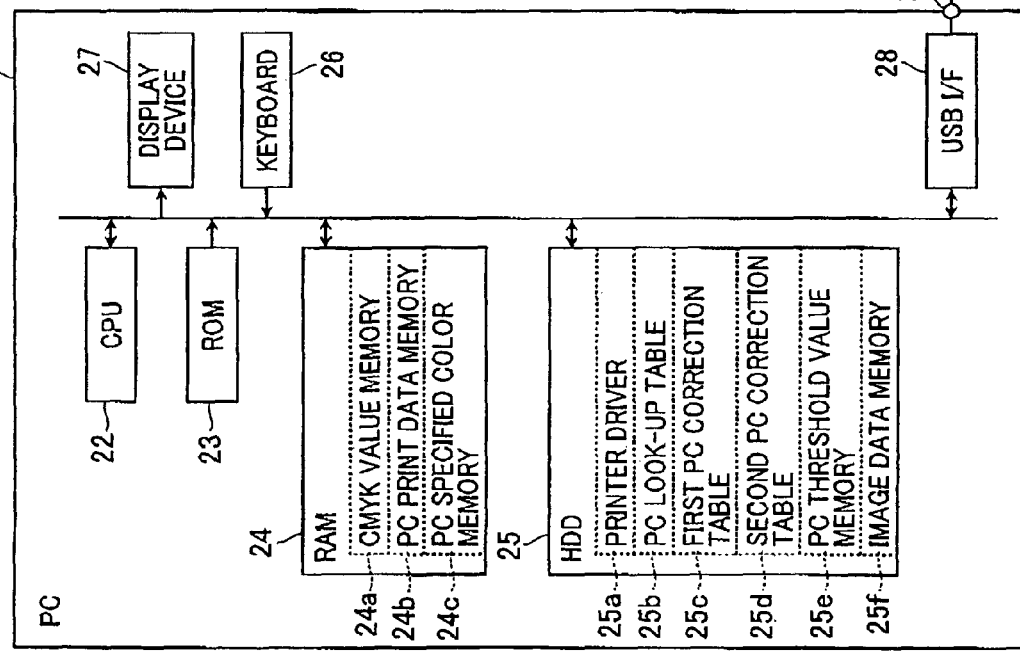

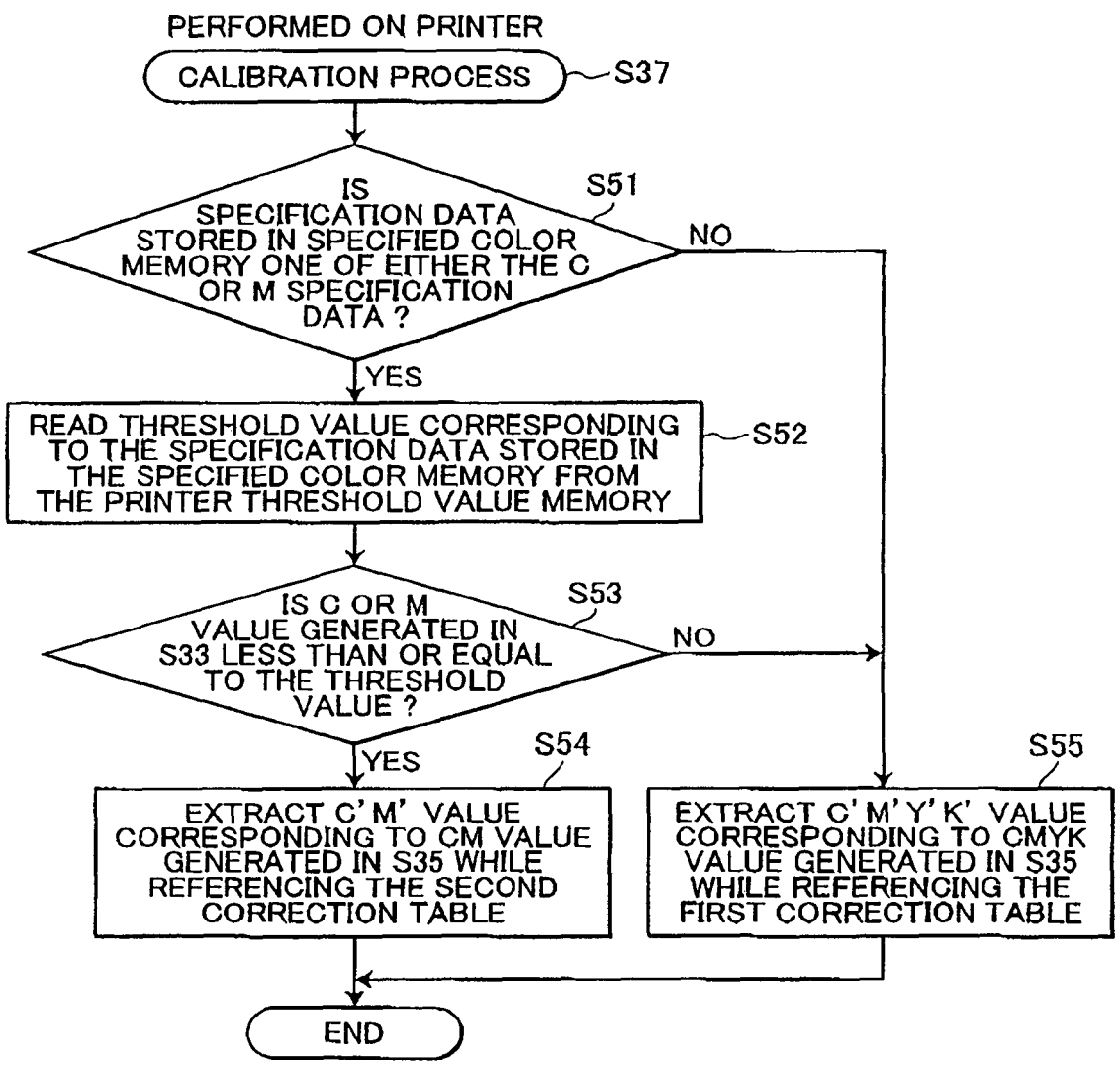

IMAGE PROCESSING DEVICE THAT PROCESSES COLOR IMAGE DATA

CROSS REFERENCE TO RELATED APPLICATIONS

This application claims priority from Japanese Patent Application No. 2005-245286 filed Aug. 26, 2005. The entire content of the priority application is incorporated herein by reference.

TECHNICAL FIELD

The disclosure relates to an image processing device and image processing program for processing color image data.

BACKGROUND

Conventionally, color printing on a color printer is performed using print data generated on a personal computer, for example. The print data is formed of either color image data (input image) generated on the personal computer, or color image data inputted into the personal computer from an external source. The color image data is formed from RGB values, which are the three base colors red, green, and blue. Since the base color configuration for rendering colors is different depending on whether the colors are rendered with an optical system or a printing system, print data cannot be formed of RGB values. Accordingly, print data is created by converting the RGB values to a color system used in color printers, such as CMY values having the base colors cyan, magenta, and yellow or CMYK values having the base colors cyan, magenta, yellow, and black. Generally, RGB values are converted to CMY values by referencing a look-up table storing correspondence relationships between these values.

The look-up table described above functions to convert R, G, and B values from the RGB color space to C, M, and Y values constituting the CMY color space. However, since a look-up table for converting 0-255 8-bit signals of the R value, G value, and B value to 0-255 8-bit C, M, and Y values would be considerably large, computers ordinarily use a look-up table storing CMY values corresponding to only representative points in the RGB values. CMY values corresponding to RGB values other than the representative points are calculated through interpolation.

Since CMY values computed through interpolation are displayed in a finite number of digits (8 bits), digits in the computed numbers that are below the significant digits are either rounded up or rounded down, resulting in rounding errors. In other words, the calculated results often deviated from the correct values. As a result of this deviation, the color of the actual printed image (hue and tone) is different from the color of the inputted image, thereby reducing reproducibility of the inputted image. The drop in tone reproducibility in particular results in a noticeable drop in image quality. Therefore, when performing a conversion process using a look-up table to convert RGB values to CMY values, the generated CMY values are sometimes expressed with a greater number of bits (an increased number of effective digits), such as 10 or 12 bits, as described in U.S. Pat. No. 5,075,767 (corresponding to Japanese Patent Application Publication No. 63-304773). This method can reduce error between the calculated result and the correct value and improve color (tone) reproducibility in the printed image, thereby forming printed images of a higher quality.

SUMMARY

However, the generated CMY values are further corrected based on characteristics of the color printer since color tones in the actual printed image are affected by the characteristics of the printer. Accordingly, when the number of bits in the CMY values has been increased as described above, a large number of bits must be processed in the calibration process, resulting in more complex computations.

The increased number of bits in the CMY values also increases the number of bits that must be processed for each pixel, resulting in an increased processing time. Since the process to convert RGB values to CMY values and the process to correct the CMY values must be performed for each pixel in the inputted image, an A4-size sheet of paper printed at 600 dpi resolution, for example, involves the processing of approximately 32 million pixels. Hence, even though the processing time per pixel increases only slightly, the processing time for the entire image increases dramatically, greatly reducing processing speed.

Digital cameras seeing widespread use in recent years commonly use external storage media that can be directly mounted in the camera to store JPEGs or other image data taken by the camera. It is now common to see color printers capable of reading and printing image data from the storage media. While these types of color printers can print images without the use of a computer, the printers cannot be equipped with a large-capacity memory such as that found in personal computers. Hence, these printers have insufficient memory capacity for generating CMY values in a large number of bits from RGB values using a look-up table and for correcting the CMY values and, therefore, are unable to perform such image processing. As a result, reading image data directly from this type of storage media and printing the image data on a color printer results in a drop in image quality.

In view of the foregoing, it is an object of one aspect of the invention to provide an image processing device and an image processing program capable of improving both the image processing speed fox generating print data and the quality of the printed image.

In order to attain the above and other objects, according to one aspect, the invention provides an image processing device. The image processing device includes a printing unit, an input-color-data storing portion, a print-data generating portion, and a correcting portion. The printing unit prints an image based on print data. The printing unit has characteristics. The input-color-data storing portion stores input color data indicative of colors of inputted image data. The input color data have color component values of a first color group. The print-data generating portion converts the color component values of the first color group stored in the input-color-data storing portion into color component values of a second color group, thereby generating pre-correction print data having a predetermined bit width. The correcting portion converts the pre-correction print data into post-correction print data that is adapted to the characteristics of the printing unit. The correcting portion includes a bit-width correcting portion that generates the post-correction print data having a bit width greater than the predetermined bit width. The bit-width correcting portion selectively increases the bit width based on predetermined criteria.

According to another aspect, the invention provides a storage medium storing a set of program instructions executable on an image processing device. The set of program instructions includes storing input color data indicative of colors of inputted image data, the input color data having color component values of a first color group, converting the color component values of the first color group stored by the storing instructions into color component values of a second color group, thereby generating pre-correction print data having a predetermined bit width, converting the pre-correction print data into post-correction print data that is adapted to characteristics of a printing unit, and outputting the post-correction print data to the printing unit. The instructions for converting the pre-correction print data into post-correction print data include selectively increasing a bit width of print data based on predetermined criteria, thereby generating the post-correction print data having a bit width greater than the predetermined bit width.

BRIEF DESCRIPTION OF THE DRAWINGS

Illustrative aspects in accordance with the invention will be described in detail with reference to the following figures wherein:

FIG. 1 is a block diagram showing the electrical structure of a personal computer and a printer according to illustrative aspects of the invention;

FIG. 8 is a flowchart illustrating steps in a calibration process executed during the printer color conversion process.

DETAILED DESCRIPTION

Figure 2:
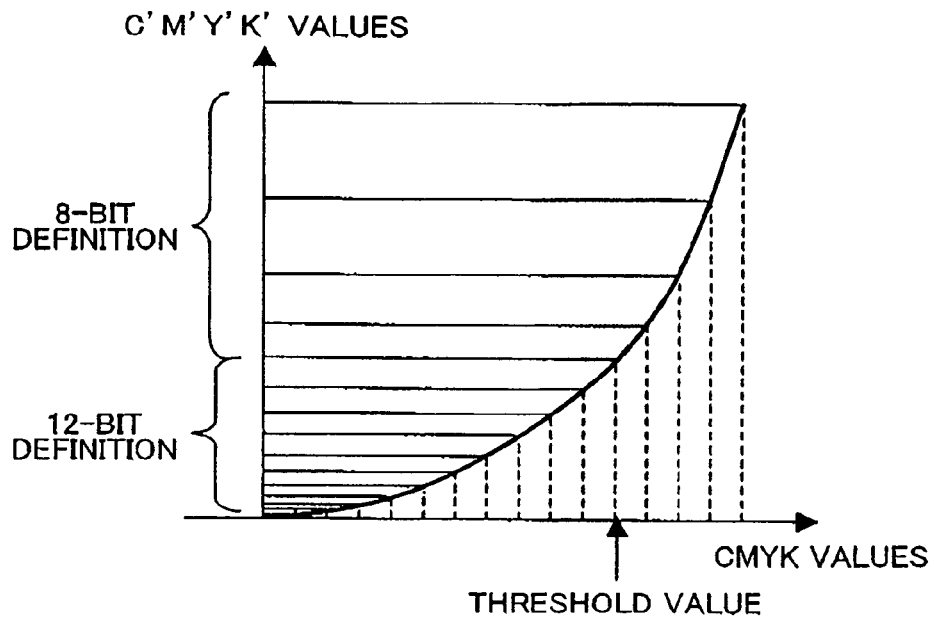
FIG. 2 is an explanatory diagram conceptually illustrating tone correction according to a first printer correction table, a second printer correction table, a first PC correction table, and a second PC correction table.

An image processing device and an image processing program according to some aspects of the invention will be described while referring to the accompanying drawings. FIG. 1 is a block diagram showing an electrical structure of a personal computer 20 and a printer 1. The printer 1 can print color images based on image data received from the personal computer 20 or image data stored in external media 40 mounted in an external media slot 10 of the printer 1. Further, the printer 1 and the personal computer 20 are configured to perform a tone correction process on CMY values for forming printed images of a low density less than or equal to a predetermined value (a density value of 0.35) in order to generated corrected color component values (C'M'Y' values) in a large number of bits.

The printer 1 includes a CPU 2, a ROM 3, a RAM 4, a data RAM 5, a control panel 6, a print head 7, a sheet-conveying motor 8, a carriage motor 9, the external media slot 10, a USB interface 11, and a USB terminal 12. Each of these devices is connected to the CPU 2 by a connection line 13 configured of a bus line, cables, and the like and is controlled by the CPU 2.

The CPU 2 is a microprocessor that functions to execute various programs stored in the ROM 3. The ROM 3 is read-only memory that stores the various control programs executed by the CPU 2, as well as data required when the CPU 2 executes these control programs. The control programs stored in the ROM 3 include a print control program 3a, and a printer color conversion program 3b.

The print control program 3a is a program for controlling printing operations of the printer 1. Based on the print control program 3a, the CPU 2 drives the carriage motor 9 and the sheet-conveying motor 8, while driving actuators in the print head 7 for ejecting ink from nozzles in the print head 7 in order to print predetermined characters and patterns on a sheet material.

The CPU 2 executes the printer color conversion program 3b in order to convert RGB values of inputted image data into CMYK values based on a printer look-up table 3c and a UCR curve 3f to generate print data. The printer color conversion program 3b also directs the CPU 2 to correct the CMYK values generated above (calibration process (S37) and error diffusion process (S45)) based on characteristics of the printer 1 (the print head 7). The printer color conversion program 3b is based on the flowchart shown in FIGS. 7 and 8.

When using a dither matrix technique to form halftones in a halftone process (multilevel process), a large dither matrix is required if the CMYK values are generated with different bit widths, resulting in increased costs and a more complex process. The illustrative aspects avoid these problems by performing the halftone process (multilevel process) using an error diffusion method.

Here, properties of the printer 1 (the print head 7) include not only the printing technique employed on the printer 1, but also any other properties that result in different color rendering (tone and hue) despite outputting the same print data. For example, properties of the printer 1 include the density and color-developing properties of the image formation material used in the printer 1, such as ink or toner; the shape and technique employed in members used to eject the image formation material (nozzles, for example); and electrical properties accompanying the operation of actuators used to form the images (ink ejection properties of the print head 7).

The printer look-up table 3c stores CMY values associated with RGB values for converting RGB values included in the inputted image data to CMY values. The RGB values are configured of the three primary colors of light and include an R value representing red, a G value representing green, and a B value representing blue. Since various colors can be produced by mixing the three primary colors, the color of each pixel and an inputted image indicates one color (hue, tone, etc.) through a combination of an R value, a G value, and a B value (RGB values) However, the printer 1 generates colors by modifying the dot percent for ink in each of the colors cyan, magenta, and yellow (as well as black). CMY values include a combination of a C value indicating the cyan color component, an M value indicating the magenta color component, and a Y value indicating the yellow color component. Each of the C, M, and Y values specify the amount of ink (dot percent). Each color (hue, tone, etc.) is specified by a combination (CMY values, CMYK values) of a C value, an M value, and a Y value (and maybe a K value specifying black).

As it is known which RGB values correspond to which CMY values, the printer look-up table 3c is created based on these correspondence relationships. Hence, inputted color image data can be printed by referencing the printer look-up table 3c to change the format of the color signals from the RGB format to the CMY format.

The printer look-up table 3c stores C, M, and Y values, each formed of 8-bit data, corresponding to R, G, and B values, each formed of 8-bit data. In order to reduce the amount of stored data, the printer look-up table 3c stores only CMY values corresponding to specific RGB values. More specifically, values at increments of 16 in the 0-255 RGB values (0, 16, 32, . . . , 255) are set as representative values, and only CMY values corresponding to these representative values are stored in the printer look-up table 3c. CMY values corresponding to RGB values other than the representative values are calculated using linear interpolation of the CMY values corresponding to the representative values. The linear interpolation calculation is well known in the art and will not be described herein.

The ROM 3 also includes a first printer correction table 3d and a second printer correction table 3e used for correcting CMYK values converted from RGB values. The first printer correction table 3d and second printer correction table 3e store C'M'Y'K' values corresponding to the CMYK values and indicating the true color tone that the CMYK values produce. In other words, the first printer correction table 3d and the second printer correction table 3e are used to correct color tone.

If print data is formed from CMY values (or CMYK values) converted from RGB values without performing tone correction, the quality of the image printed by the print head 7 may be poor due to a visual non-uniformity in the tone of the printed image. This is because a linear relationship does not exist between the CMYK values converted directly from RGB values and the actual tone that appears in the printed image since the tone is influenced by the characteristics of the printer 1 (such as the density of the ink and the ink ejection characteristics of the print head 7).

Hence, by providing the printer 1 with the first printer correction table 3d and second printer correction table 3e, the CPU 2 references these tables in a printer color conversion process and corrects the CMYK values to C'M'Y'K' values in order to produce the tone corresponding to the print data (CMYK values) generated from the RGB values. In other words, the first printer correction table 3d and the second printer correction table 3e are used to enable CMYK outputs to have a linear relationship in terms of density.

Here, the first printer correction table 3d includes four one-dimensional lookup tables (correction curves) corresponding to the C values, M values, Y values, and K values, respectively. Each table stores respective 8-bit C' values, M' values, Y' values, and K' values corresponding to the 8-bit C values, M values, Y values, and K values.

The second printer correction table 3e includes two one-dimensional lookup tables (correction curves) that correspond to C values and M values, respectively. The tables store 12-bit C' values and M' values corresponding to 8-bit C values and M values. The printer 1 increases the number of bits for these values by correcting the bit width of the print data based on the second printer correction table 3e.

The number of bits is increased to increase the number of significant digits in order to specify a more precise value. Since the number of significant digits increases as the bit width increases, the corrected C', M', Y', and K' values can take on a more precise value. In other words, by increasing the number of bits, it is possible to increase the number of color levels in order to render more detailed tones.

The printer 1 of the illustrative aspects increases the number of bits only for specific colors (cyan and magenta in the illustrative aspects) rather than all CMYK values. Hence, the second printer correction table 3e includes only tables corresponding to C values and M values. Further, C' values and M' values corresponding to C values and M values less than or equal to a threshold value are stored in the second printer correction table 3e as 12-bit values. C'M'Y'K' values corresponding to CMYK values that belong in the range greater than the threshold value are stored in the first printer correction table 3d.

The printer 1 is also capable of printing image data from the external media 40 mounted in the external media slot 10. However, since the memory capacity of the printer 1 is limited, the printer 1 cannot store a large volume of data and a great burden is placed on the work area in the RAM 4 to perform operations on a large amount of data. Therefore, it is necessary to reduce the amount of data pre-stored on the printer 1 and to use the RAM 4 efficiently. To aid in this, the printer 1 does not increase the number of bits for all CMYK values, but only for specific colors (cyan and magenta in the illustrative aspects). Further, the process to increase the number of bits in the CMYK values is restricted to cyan and magenta having a density of less than or equal to 0.35 in the printed image.

When the tone of the printed image is on the high density side, slight fluctuations in density (tone fluctuations) do not cause a noticeable decline in image quality. However, tone jump is more noticeable in a printed image toward the low density side and can lead to a serious decline in image quality. In addition, cyan and magenta ink have a greater density than yellow ink. Therefore, large variations in the tone of cyan and magenta ink due to fluctuations in ejection amounts (C values and M values) are much more striking than such fluctuations in yellow ink, particularly when the tone (density) of the printed image is a low density. In other words, tone jump for cyan and magenta in the low-density range is a major factor causing a drop in image quality. Hence, the printer 1 executes a process to increase the number bits in the print data only when forming images in which the cyan and magenta are less than or equal to a predetermined density (threshold value). That is, the printer 1 only increases the number of bits in print data or regions that can produce a noticeable drop in image quality when forming the actual image. Accordingly, the printer 1 can use the RAM 4 efficiently and speed up image processing, while forming printed images of a high quality.

The UCR curve 3f is a function for generating the black color component (K value) from CMY values, defining correspondence relationships between the CMY values and the K values. The CPU 2 references the UCR curve 3f when generating K values based on CMY values converted from the RGB values (see FIG. 4). The UCR curve 3f may be in the form of a table storing K values in association with CMY values.

The ROM 3 also includes a printer threshold value memory 3g that stores a threshold value defining a range in which the bit width is increased in the second printer correction table 3e. Since the printer 1 is configured to correct only C and M values to C' and M' values having a greater bit width as described above, the printer threshold value memory 3g stores one threshold value for each of C and M color components. When performing tone correction in a printer conversion process, the C and M values are converted to C' and M' values having a greater bit width if the C and M values converted from RGB values are less than or equal to the threshold value stored in the printer threshold value memory 3g.

The threshold value stored in the printer threshold value memory 3g are predetermined based on the actual density of printed images. The threshold value may be set arbitrarily within a range in which the density of the printed image is less than or equal to approximately one-sixth the maximum density, for example. In the illustrative aspects, the threshold value is set to 0.35.

The RAM 4 is a memory serving to temporarily store data and programs that the CPU 2 requires when executing various processes. The RAM 4 includes a print data memory 4a, and a specified color memory 4b.

The print data memory 4a functions to store print data outputted to the print head 7. As described above, when the image data inputted into the printer 1 is formed of RGB values, the printer 1 generates CMYK values from these RGB values and further subjects the CMYK values to tone correction based on characteristics of the printer 1 (generating C'M'Y'K' values) and error diffusion, outputting the result to the print head 7 as print data. The CPU 2 controls ejection operations in the print head 7 for ejecting cyan, magenta, yellow, and black ink in order to form a printer image based on the print data stored in the print data memory 4a (after the data has undergone error diffusion and has been corrected to a greater bit width).

The specified color memory 4b functions to indicate which of the C, M, Y, and K values are to be processed in the printer color conversion process. The specified color memory 4b stores any of C specification data, M specification data, Y specification data, and K specification data for specifying the C, M, Y, and K values, respectively. In the printer color conversion process, the printer 1 executes a calibration process (S37 of FIG. 7) based on the first printer correction table 3d and second printer correction table 3e for each color component (C value, M value, Y value, K value) of each pixel. Specification data specifying which color component to process is written to the specified color memory 4b when the calibration process begins. The CPU 2 can reference the specified color memory 4b at any time during the printer color conversion process to execute a process on the color component corresponding to the specification data stored therein.

The data RAM 5 is an inexpensive large capacity memory configured of dynamic RAM and functions to store image data inputted from the personal computer 20. The printer 1 is connected to the personal computer 20 and prints image data inputted therefrom. Image data inputted from the personal computer 20 has already been converted to print data and need not undergo color conversion on the printer 1. This image data is written to the data RAM 5 and temporarily stored therein. When printing is executed on the printer 1, the CPU 2 reads the image data (print data) from the data RAM 5 and writes the data to the print data memory 4a. After the image data has been printed, the data is deleted from the data RAM 5. While there is generally a large volume of image data, this data can be deleted as soon as the data has been printed, thereby effectively using the data RAM 5.

Here, there is no need to write all of the image data stored in the data RAM 5 to the print data memory 4a at once. For example, data stored in the data RAM 5 can be written to the print data memory 4a one page, one block, or one line at a time.

The control panel 6 enables a user to perform various settings on the printer 1. In addition to input switches and a ten-key numeric pad for inputting various settings, the control panel 6 includes a liquid crystal display that displays data inputted via the input switches and 10 keypad and the operating status of the printer 1.

The print head 7 is an inkjet head having a plurality of nozzles and actuators (not shown in the drawings). Since the printer 1 is configured to perform color printing, the print head 7 includes four inkjet heads corresponding to cyan, magenta, yellow, and black ink. A signal outputted from the CPU 2 (multilevel data corresponding to cyan, magenta, yellow, and black ink) is inputted into the drive circuit of the actuator via a gate array (not shown). The drive circuit applies a drive pulse of a waveform suited to the inputted signal to the actuators corresponding to each nozzle. This drive pulse drives the actuator to eject ink droplets via the nozzles in order to print predetermined characters or patterns.

The sheet-conveying motor 8 is a stepping motor for conveying a sheet material disposed in a predetermined position of the printer 1 in a downstream or an upstream direction. The CPU 2 controls the driving of the sheet-conveying motor 8. When driven by the CPU 2, the sheet-conveying motor 8 supplies the sheet material along a surface below the print head 7 (the surface opposing the nozzle openings).

The carriage motor 9 is a stepping motor for driving a carriage (not shown) in which the print head 7 is mounted in a direction orthogonal to the direction that the sheet-conveying motor 8 conveys the sheet material. The carriage motor 9 drives the carriage in a reciprocating motion between a starting point serving as an initial position of the carriage and an ending point serving as a boundary position of the carriage on the opposite side from the starting position. The CPU 2 controls movement of the carriage motor 9.

While not shown in the drawings, driver circuits are provided for each of the sheet-conveying motor 8 and carriage motor 9. The driver circuits convert 5 volt control signals from the CPU 2 to 12 volt drive voltage for driving the motors and inputs this drive voltage into the respective sheet-conveying motor 8 and carriage motor 9 for driving the same. In the illustrative aspects, the sheet-conveying motor 8 and carriage motor 9 are configured of stepping motors. However, the sheet-conveying motor 8 and carriage motor 9 may be configured of DC motors.

The external media slot 10 accepts a detachably mounted external media 40, which stores image data taken by a digital camera or the like. When the external media 40 is mounted in the external media slot 10, the CPU 2 reads the image data (RGB values) stored on the external media 40 and inputs the image data into the printer 1.

The USB interface 11 enables communications with the personal computer 20 via a USB cable connected to the USB terminal 12. Image data transmitted from the personal computer 20 is inputted into the printer 1 via the USB interface 11.

In the printer 1 of the illustrative aspects, the Y value corresponding to yellow is the color component value that does not undergo an increase in bit width in tone correction. Since the density of yellow ink is lower than that of cyan and magenta, fluctuations in tone density caused by an increase in the ink ejection amount are smaller than those for cyan and magenta. In the illustrative aspects, a density change in the printed image with respect to a change in the cyan or magenta color component values is set as a reference value. The process for increasing the bit width is not executed for color component values having a smaller density change than the reference value.

While the printer 1 of the illustrative aspects is configured to perform color printing based on cyan, magenta, yellow, and black ink, that is, CMYK values, the printer 1 may instead be configured to form images using light cyan and light magenta ink in addition to these colors. In this case, the printer 1 may be configured to perform tone correction on the yellow, light cyan, and light magenta color components in 8 bits, without increasing the bit width of these values.

The personal computer 20 includes a CPU 22, a ROM 23, a RAM 24, a hard disk drive (HDD) 25, a keyboard 26, a display device 27, a USB interface 28, and a USB terminal 29. These devices are all connected to the CPU 22 via a connection line 30 configured of a bus line, cable, or the like and are controlled by the CPU 22.

The CPU 22 is a microprocessor for executing various programs stored in the ROM 23 and hard disk drive 25. The ROM 23 is a read-only memory for storing BIOS programs and other programs executed by the CPU 22, constant values and other data.

The RAM 24 functions to temporarily store data and programs that the CPU 22 requires for executing various processes. The RAM 24 includes a CMYK value memory 24a, a PC print data memory 24b, and a PC specified color memory 24c.

The CMYK value memory 24a stores image data produced by converting image data in the RGB format stored in an image data memory 25f described later to image data of the CMY format. Image data stored in the CMYK value memory 24a is formed by converting RGB values of each pixel in the image data stored in the image data memory 25f to CMYK values based on a PC look-up table 25b described later.

The PC print data memory 24b functions to store print data outputted to the printer 1. Hence, print data stored in the PC print data memory 24b is the actual data used for printing images on the printer 1 (the image data inputted to the printer 1). The print data stored in the PC print data memory 24b is configured of multilevel data corresponding to cyan, magenta, yellow, and black ink produced after correcting the CMYK values stored in the CMYK value memory 24a through tone correction, error diffusion, and the like. The CPU 22 writes corrected values to the PC print data memory 24b each time after correcting the CMYK values stored in the CMYK value memory 24a. Once the print data stored in the PC print data memory 24b is outputted to the printer 1, the print data is deleted from the PC print data memory 24b.

The PC specified color memory 24c specifies which of the C, M, Y, and K values is to be processed in the PC color conversion process described later (see FIG. 5). The PC specified color memory 24c stores one of the C specification data, M specification data, Y specification data, and K specification data specifying the C, M, Y, and K values, respectively. The PC color conversion process is configured to execute a calibration process (S7 of FIG. 6) for performing tone correction using a first PC correction table 25c and a second PC correction table 25d for each color component (C, M, Y, and K values) of each pixel. The specification data specifying which color component to be processed is written to the PC specified color memory 24c at the beginning of the calibration process. The CPU 22 references the PC print data memory 24b at any time during the PC color conversion process and performs processes on the color component values corresponding to the specification data stored in the PC specified color memory 24c.

The hard disk drive 25 is a rewritable, nonvolatile, large-capacity memory. Being nonvolatile, the hard disk drive 25 can preserve data after the power has been shut off. The hard disk drive 25 stores various control programs executed by the CPU 22.

The hard disk drive 25 is configured of a printer driver 25a, the PC look-up table 25b, the first PC correction table 25c, the second PC correction table 25d, a PC threshold value memory 25e, and the image data memory 25f.

The printer driver 25a is a program for converting text data or image data created on such application programs as programs for creating text documents or images into print data that can be printed on the printer 1 and for outputting this print data to the printer 1. The personal computer 20 performs image processing on the text or images included in the text data and image data according to the printer driver 25a and generates image data for printing in the RGB format (RGB values) from image data created in the application (RGB format). Subsequently, the personal computer 20 generates print data by converting the RGB values in the generated image data to CMYK values and creates print data (multilevel data based on the image data in the CMYK format) through various corrections of the generated print data (CMYK values). The printer driver 25a includes a program implementing the flowchart shown in FIGS. 5 and 6.

When correcting print data, it is necessary to perform tone correction based on the printer 1, which is the output destination of the print data. The first PC correction table 25c and second PC correction table 25d for performing such tone correction are written to the hard disk drive 25 when the printer driver 25a is installed on the personal computer 20. Further, when the printer driver 25a is installed on the personal computer 20, a threshold value is stored in the PC threshold value memory 25e for restricting the range in which the bit width is expanded for color tones of the print data.

The PC look-up table 25b stores CMYK values associated with RGB values for converting RGB values included in image data inputted into the personal computer 20 or created on the personal computer 20 (strictly speaking, image data of the RGB format that the printer driver 25a converts from image data created in an application on the personal computer 20, or image data inputted from an external source). In other words, as with the printer look-up table 3c, the PC look-up table 25b enables the personal computer 20 to convert the format for rendering color signals in the image data from the RGB format to the CMY format, thereby generating print data for printing the image data.

Further, the PC look-up table 25b stores 8-bit C, M, Y, and K values corresponding to 8-bit R, G, and B values. In order to reduce the amount of stored data, the PC look-up table 25b stores only CMYK values corresponding to specific RGB values. More specifically, every sixteenth value in the 0-255 RGB values (0, 16, 32, ..., 255) are set as representative values, and CMYK values corresponding to these representative values are stored in the PC look-up table 25b. CMYK values corresponding to RGB values other than the representative values are calculated through linear interpolation of the CMYK values corresponding to the representative values. The linear interpolation calculation is well known in the art and will not be described herein.

Since the PC look-up table 25b stores CMYK values corresponding to the RGB values, K values for the black component can be generated without using a UCR curve. Further, the PC look-up table 25b is configured to not generate K values when the C, M, and Y values are less than a predetermined value (see FIG. 3).

In the illustrative aspects, CMY values or CMYK values are generated in 8 bits through color conversion with the printer look-up table 3c and PC look-up table 25b. Hence, the bit width of the values is not expanded when converting to the CMY format with the look-up tables 3c and 25b.

The first PC correction table 25c and second PC correction table 25d function to correct CMYK values converted from RGB values by performing tone correction, as with the first printer correction table 3d and second printer correction table 3e. In other words, the first PC correction table 25c and second PC correction table 25d store C'M'Y'K' values in association with the CMYK values converted from RGB values in order to render the actual color tone specified by the CMYK values.

In the illustrative aspects, the first PC correction table 25c is configured of four one-dimensional lookup tables (correction curves) corresponding to each of the C, M, Y, and K values. Each table stores 8-bit C', M', Y', or K' values corresponding to the 8-bit C, M, Y, or K values.

The second PC correction table 25d includes three one-dimensional lookup tables (correction curves) corresponding to the C, M, and Y values and stores 12-bit C', M', and Y' values corresponding to the respective 8-bit C, M, and Y values. Correction performed based on the second PC correction table 25d expands the bit width of the print data to a larger number of bits than that before correction. The second PC correction table 25d does not have a table corresponding to K values since the bit width for K values is not expanded in the personal computer 20. The second PC correction table 25d stores 12-bit values for C', M', and Y' values corresponding to C, M, and Y values less than or equal to a threshold value. The first PC correction table 25c stores C', M', Y', and K' values corresponding to CMYK values outside of this range (exceeding the threshold value).

The PC threshold value memory 25e functions to store a threshold value defining the range in which bit width expansion is executed in the second PC correction table 25d. As described above, since the personal computer 20 is configured to correct C, M, and Y values to C', M', and Y' values having a wider bit width, the PC threshold value memory 25e stores one threshold value for each of the C, M, and Y values. During the PC color conversion process on the personal computer 20, the CPU 22 references the PC threshold value memory 25e and converts the C, M, and Y values to C', M', and Y' values having a greater bit width when the CMY values converted from the RGB values are less than or equal to the threshold value stored in the PC threshold value memory 25e (0.35 in the illustrative aspects).

The threshold value stored in the PC threshold value memory 25e is predetermined based on the density of the actual printed image for image data (print data) that the personal computer 20 outputs to the printer 1. For example, the threshold value may be set arbitrarily to a value within a range of densities less than approximately one-sixth of the maximum density. As described above, the threshold value in the illustrative aspects is set to 0.35.

The image data memory 25f stores image data in the RGB format. Image data created in an image creating application on the personal computer 20 or image data inputted from an external source is stored in the image data memory 25f after being converted to image data for printing (image data in the RGB format) by the printer driver 25a. In the PC color conversion process performed on the personal computer 20, the CPU 22 reads the RGB image data stored in the image data memory 25f and generates print data (image data in the CMY format) from this RGB image data.

The keyboard 26 allows the user to input data or commands into the personal computer 20. The display device 27 is configured of a CRT display, liquid crystal display, or the like and functions to display text, images, or the like so that the user can visually confirm details of processes executed by the personal computer 20 and data inputted into the personal computer 20.

The USB interface 28 enables the personal computer 20 to communicate with the printer 1 via a USB cable connected to the USB terminal 29. The personal computer 20 transmits image data to the printer 1 via the USB interface 28.

If the personal computer 20 is connected to a plurality of printers and configured to perform printing operations on these printers, printer drivers corresponding to each of these printers are installed on the personal computer 20. When installed, each printer driver provides a first PC correction table, second PC correction table, and PC threshold value memory area corresponding to the respective printer in the hard disk drive 25.

FIG. 2 shows a correction curve for conceptually illustrating the tone correction performed with the first printer correction table 3d, second printer correction table 3e, first PC correction table 25c, and second PC correction table 25d. In this graph, the x-axis represents the CMYK values prior to correction. The CMYK values are "0" at the point of origin and grow larger when moving away from the point of origin along the x-axis. The maximum value of each color component in the pre-correction CMYK values is "255". The y-axis in the graph represents the C'M'Y'K' values produced when correcting the CMYK values. The C'M'Y'K' values are "0" at the point of origin and grow larger away from the point of origin along the y-axis. While the maximum value of the post-correction C'M'Y'K' values is "255", these values are expressed in 12 bits within a range less than or equal to a value corresponding to the threshold value. Therefore, the C'M'Y'K' values have a different number of significant digits on either side of the threshold value. A larger value in the CMYK and C'M'Y'K' values indicates a higher density in the printed image.

As shown by the correction curve in FIG. 2, the CMYK values are corrected such that the amount of change in the post-correction C'M'Y'K' values grows smaller as the CMYK values approach the point of origin (grow smaller in value). Since variations in tone are more noticeable in lower densities of a printed image, it is necessary to perform finer control of tone in the lower density range. However, changes in tone cannot be discerned in the high-density range unless bold changes are made in the tone density (C'M'Y'K' values). Therefore, the correction tables 3d, 3e, 25c, and 25d are designed to make smaller changes in the post-correction C'M'Y'K' values in response to changes in CMYK values as the CMYK values grow smaller.

With this construction, a pseudo continuous tone can be formed in the actual printed image. In other words, this construction forms tones that are linearly proportional to the CMYK values. In the low-density range, the C'M'Y'K' values are changed by an amount less than 1 in response to a change of 1 in the CMYK values. In the high-density range, the C'M'Y'K' values change by an amount greater than 1 in response to a change of 1 in the CMYK values.

Since changes in tone are discernible with only slight changes in the C'M'Y'K' values in the low-density range, if the possible C'M'Y'K' values are few (a small number of significant digits) the tone gradient in the formed image will become irregular, resulting in "tone jump."

Tone jump is a phenomenon in which tone expected to be formed with pseudo continuity instead changes abruptly with discontinuity (the tone is not visually uniform), that is, a phenomenon in which the gradient level (density) changes greatly from one tone to the next (results in a great disparity in density). For example, when the correction of three CMYK values is expected to produce a first tone, second tone, and third tone the phenomenon of tone jump may cause all three to converge on the third tone, eliminating any change in tone level. As described above, changes in tone are more noticeable as the density of the printed image decreases. Accordingly, tone jump occurring in the low-density range will result in a more noticeable decline in image quality.

In order to eliminate this tone jump, the illustrative aspects employs the second printer correction table 3e and second PC correction table 25d (for the range indicated by "12-bit definition" in FIG. 2) for correcting the CMYK values to C'M'Y'K' values having a wider bit width of 12 bits when the CMYK values belong to the low-density range less than or equal to the threshold value, as shown in FIG. 2. When the CMYK values belong to the high-density range exceeding the threshold value, visible changes in tone are less likely to be formed without large changes in the C'M'Y'K' values. Accordingly, a great precision (number of significant digits; that is, bit width) is not required for C'M'Y'K' values in the high-density range as much as it is in the low-density range; rather, an increase in the number of bits would merely increase the complexity of calculations. Hence, the first printer correction table 3d and first PC correction table 25c (for the range indicated by "8-bit definitions" in FIG. 2 are provided for performing 8-bit image processing on CMYK values in the high-density range exceeding the threshold value, without increasing the bit width of the post-correction C'M'Y'K' values.

Hence, by restricting the range in which tone correction is performed on C'M'Y'K' values having an increased bit width to a region in which tone jump can lead to a noticeable in image quality, print data for forming high quality images can be created more quickly in the illustrative aspects.

Figure 3:
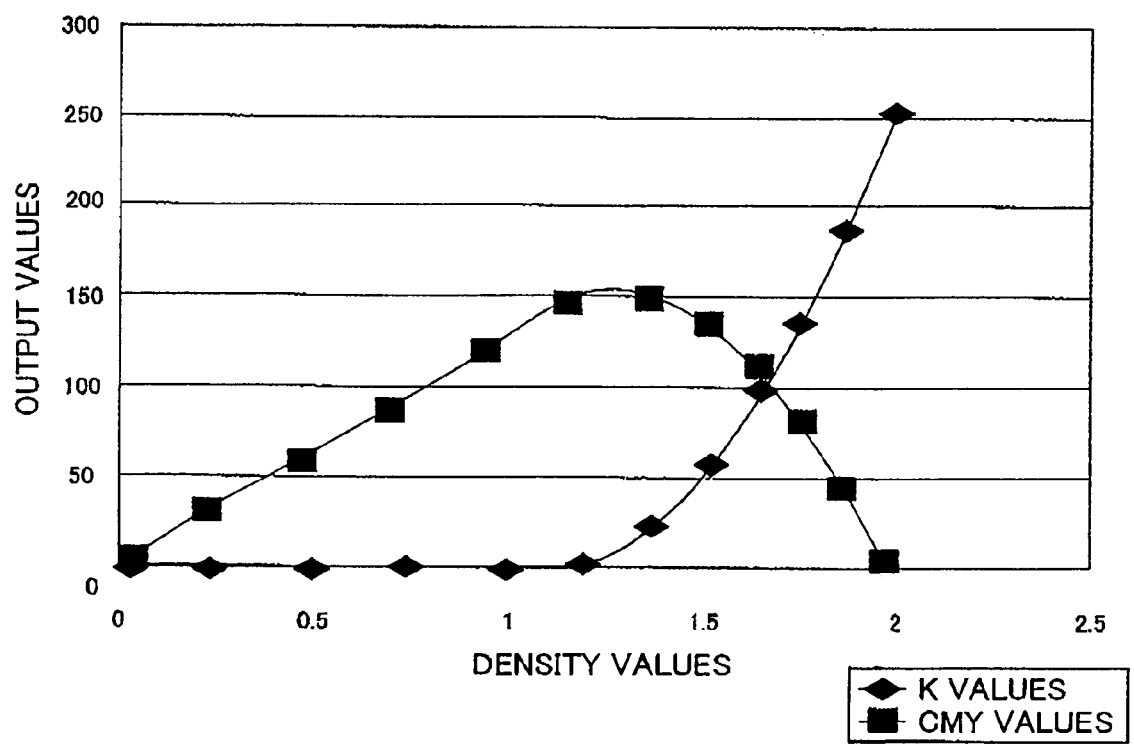
FIG. 3 is a graph illustrating the relationship between density and output values for black (K) values and cyan, magenta, and yellow (CMY) values stored in a PC look-up table.

FIG. 3 is a graph illustrating the K values stored in the PC look-up table 25b. The PC look-up table 25b stored on the personal computer 20 includes CMYK values associated with RGB values. However, as described above, the PC look-up table 25b is configured to not generate K values when the C, M, and Y values are less than or equal to a predetermined value. Specifically, the K value is "0" when the C, M, and Y values are less than or equal to a predetermined value.

In the graph of FIG. 3, the x-axis represents density values of the printed image, the density value being "0" at the point of origin and grow increasingly larger away from the point of origin along the x-axis. The y-axis represents the CMYK values (output values from 0 to 255) stored in the PC look-up table 25b, the values being "0" at the point of origin and growing increasingly larger away from the point of origin along the y-axis. In FIG. 3, the curve formed of diamond marks indicates the K values, which are generated when the density of the printed image exceeds 1.15. The curve formed of square marks indicates the CMY values. As shown in the graph, K values are generated when the minimum value among the CMY values is at least approximately 150. Hence, the PC look-up table 25b in the illustrative aspects is configured to produce K values when the density of the printed image reaches 1.15 or, from another perspective, when the CMY values exceed 150.

The K value in the CMYK values produced when converting RGB values to CMYK values is assigned the minimum value among the CMY values produced when converting the same RGB values to CMY values. Further, the differences obtained by subtracting the K value from CMY values converted from RGB values (C-K, M-K, Y-K) are set as the C value, M value, and Y value, respectively, in CMYK values converted from RGB values. Hence, a portion of the total density of a printed image formed by cyan, magenta, and yellow ink ejected based on the CMY values is replaced with the black color component (ejection of black ink). As shown in FIG. 3, therefore, as the K value increases, the CMY values decrease by the amount of increase in the K value.

Hence, the personal computer 20 is configured to produce K values when the density of the printed image exceeds 1.15, that is, when the density is a high density. Therefore, fine correction is unnecessary for tone correction on K values. Accordingly, tone correction on the personal computer 20 can be performed by correcting the K values to K' values at 8 bits without increasing a bit width.

Figure 4:
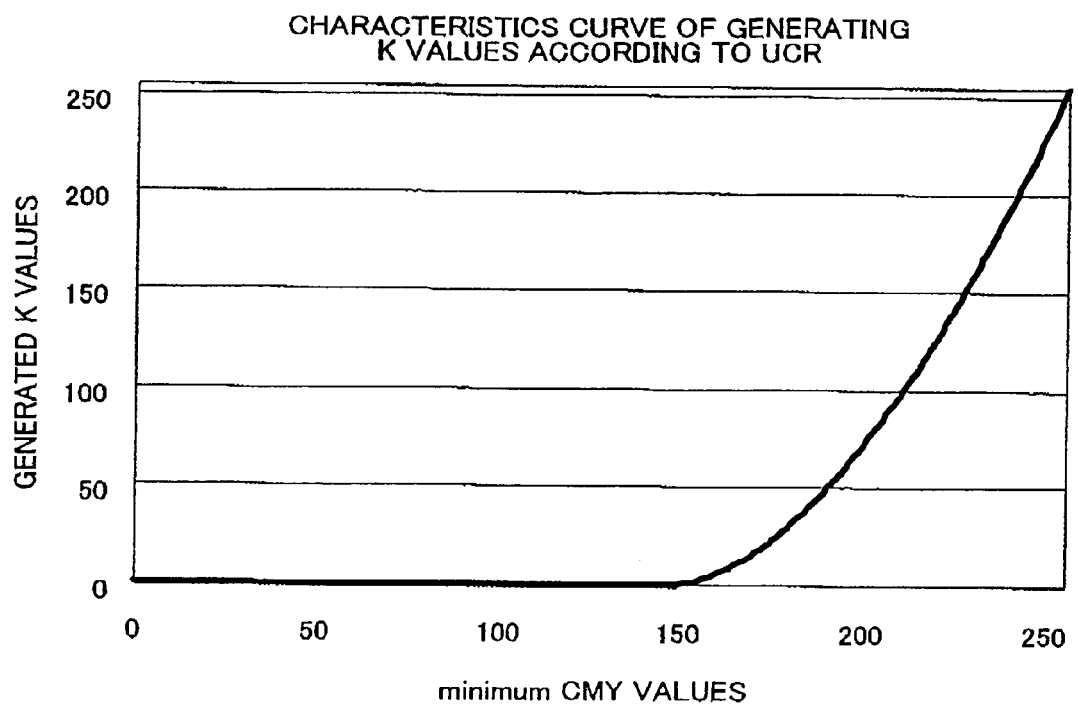
FIG. 4 is a graph illustrating the characteristics of black (K) values generated according to a UCR curve.

FIG. 4 is a graph showing the characteristics of generating K values according to the UCR curve stored in the UCR curve 3f. In this graph, the x-axis represents the minimum value among the CMY values stored in the printer look-up table 3c, while the y-axis represents the generated K value. As shown in FIG. 4, the printer 1 generates K values when the minimum value among the CMY values is at least approximately 150. In other words, a K value is generated for CMY values when these values exceed approximately 150, thereby converting CMY values to CMYK values.

In this way, the printer 1 is configured to generate K values when the density of the printed image is a high density. Hence, high precision correction is unnecessary when performing tone correction of K values. Accordingly, tone correction on the printer 1 is performed by correcting the K values to K' values at 8 bits without increasing a bit width.

Figure 6:
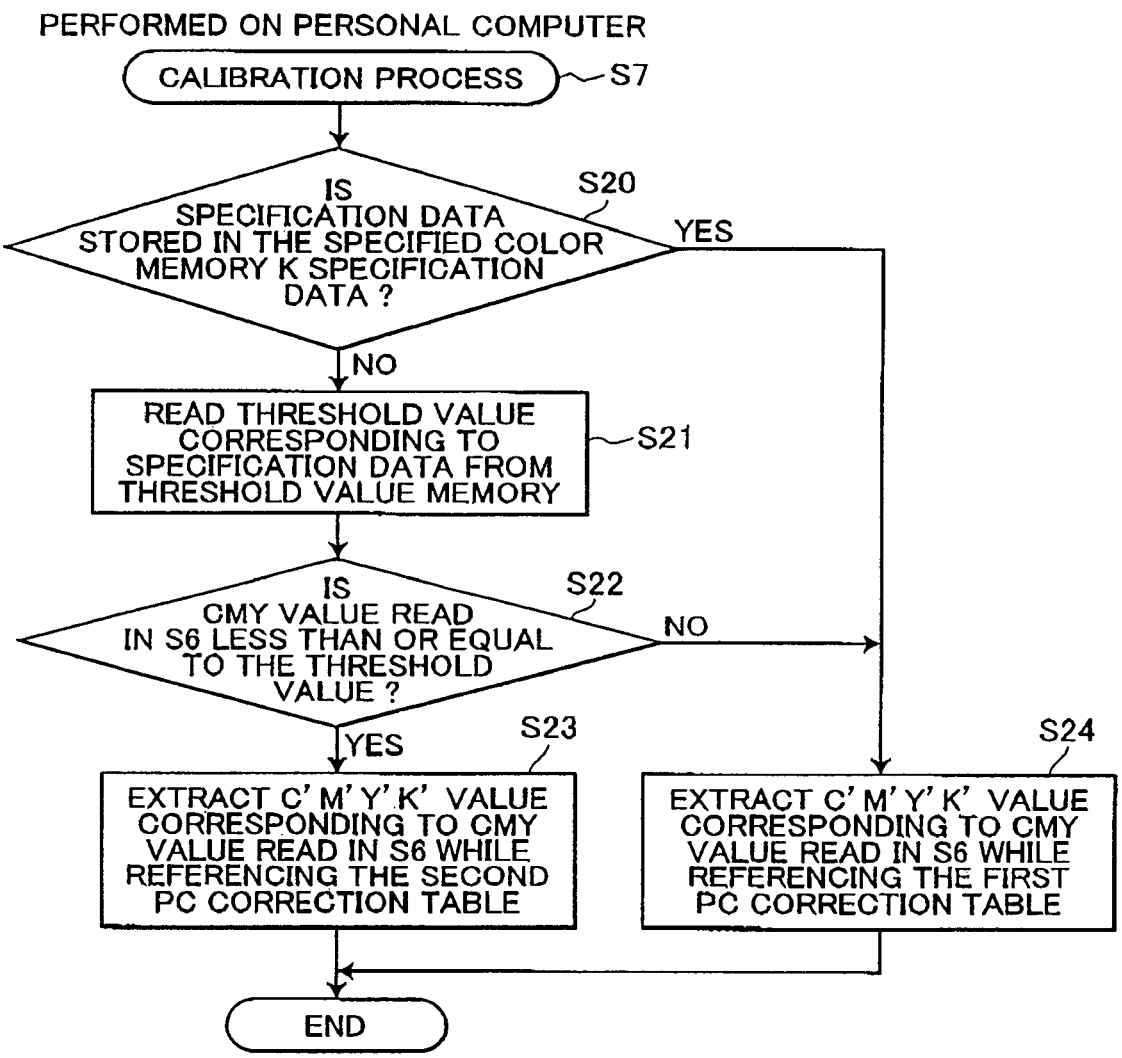
FIG. 6 is a flowchart illustrating steps in a calibration process executed during the PC color conversion process.
Figure 7:
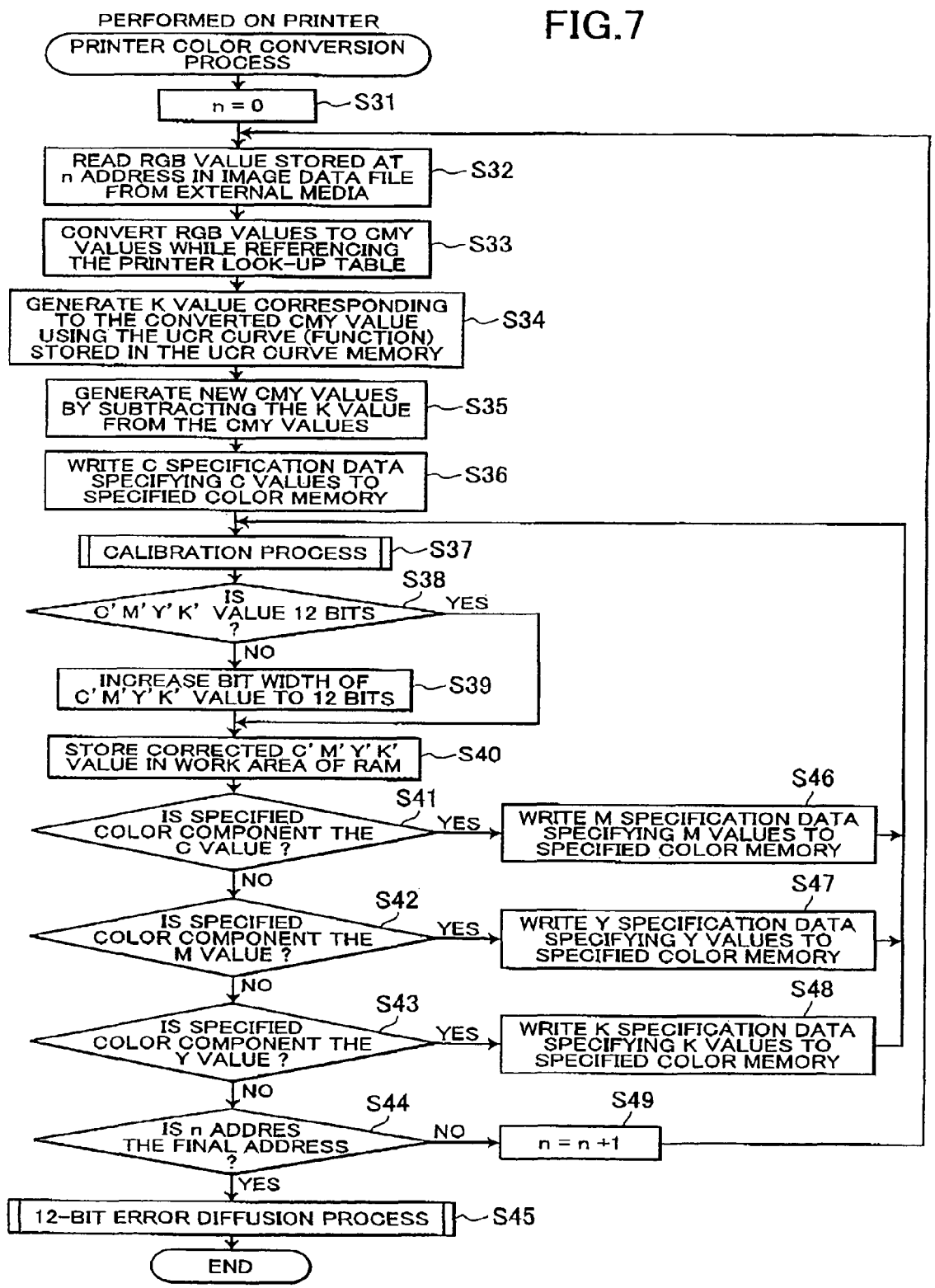
FIG. 7 is a flowchart illustrating steps in a printer color conversion process executed on a printer.

Next, a color conversion process performed by the printer 1 and the personal computer 20 having the construction described above will be described with reference to the flowcharts in FIGS. 5 through 8. FIGS. 6 and 7 illustrate a method in which print data are created in the personal computer 20 and the print data are transferred to the printer 1 for printing. FIGS. 8 and 9 illustrate a method in which print data are inputted from the external medium 40 into the printer 1 and the printer 1 can perform printing even when the personal computer 20 is not powered on. With the configuration in the illustrative aspects, both methods can be performed selectively in accordance with user's demand.

First, a PC color conversion process executed on the personal computer 20 will be described with reference to the flowcharts in FIGS. 5 and 6.

Figure 5:
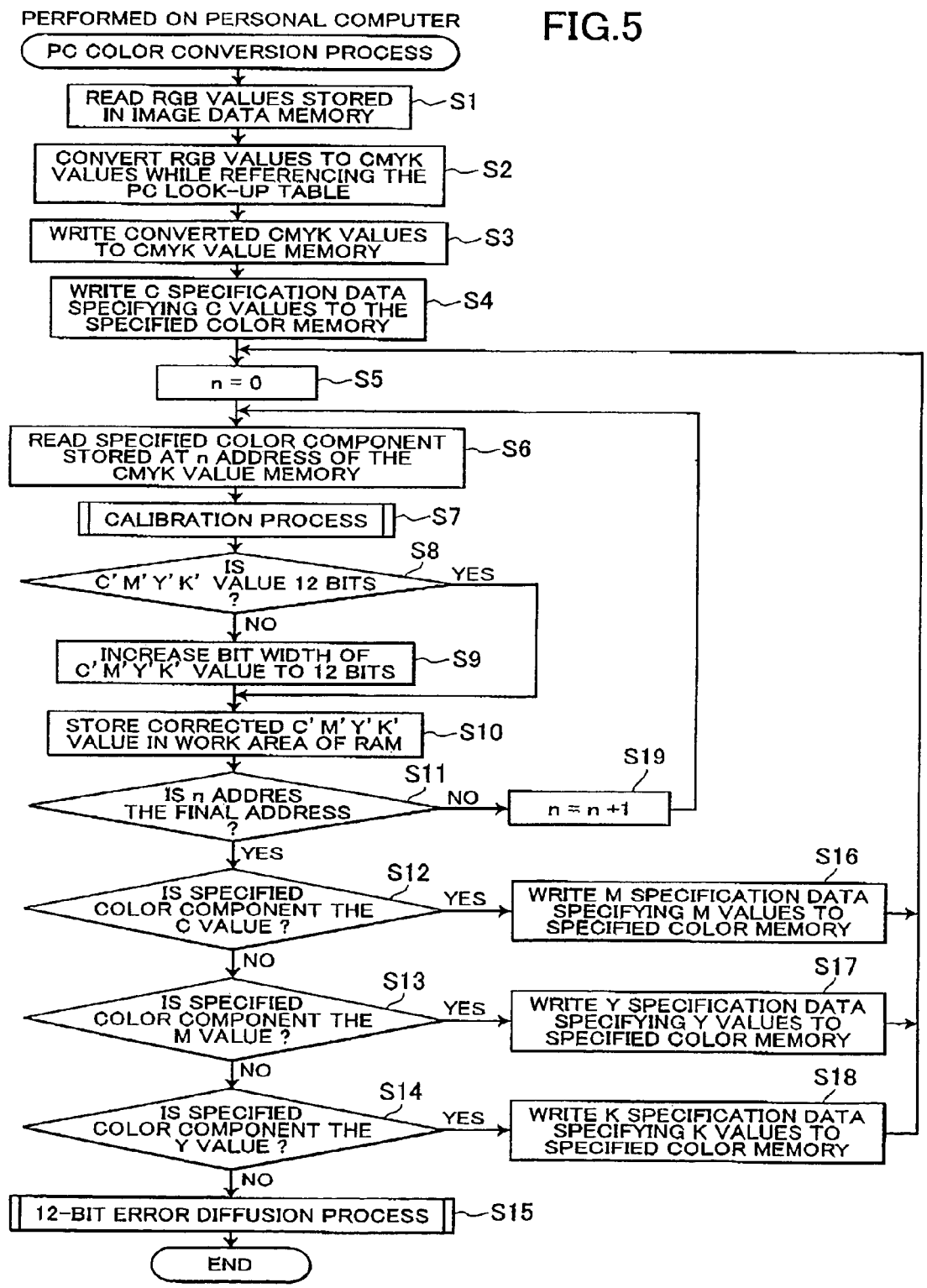
FIG. 5 is a flowchart illustrating steps in a PC color conversion process executed on a personal computer.

FIG. 5 is a flowchart illustrating steps in the PC color conversion process. This process begins when the user issues a request to perform a printing operation and is performed to convert image data stored in the image data memory 25f to print data that can be printed on the printer 1.

In S1 of the PC color conversion process, the CPU 22 of the personal computer 20 reads RGB values of the image data stored in the image data memory 25f. In S2 the CPU 22 converts the RGB values read in S1 to CMYK values while referencing the PC look-up table 25b. In S3 the CPU 22 writes the CMYK values converted in S2 to the PC print data memory 24b. Through the process of S1-S3, color components of each pixel configuring the image data stored in the image data memory 25f is converted to CMYK values and stored in the PC print data memory 24b.

In S4 the CPU 22 writes C specification data specifying the C value to the PC specified color memory 24c and in S5 sets the address pointer to 0 (n=0). In S6 the CPU 22 reads the color component value stored at the n address in the PC print data memory 24b based on the specification data stored in the PC specified color memory 24c. Since the 8-bit C, M, Y, and K values constitute four bytes worth of data, the PC print data memory 24b is assigned an address every four bytes. For example, if n=0 and the specification stored in the PC specified color memory 24c is the C specification data, the C value stored at the 0 address in the PC print data memory 24b is read.

In S7 the CPU 22 performs a calibration process on the color component read in S6 (one of the C, M, Y, or K values) for performing tone correction suited to the printer 1. In S8 the CPU 22 determines whether the CMYK value corrected in the calibration process, that is, the C', M', Y', or K' value is a 12-bit value. If the CMYK value is not corrected to 12 bits (S8: NO), then in S9 the CPU 22 converts the C', M', Y', or K' value to 12 bits and in S10 writes the 12-bit value to the work area in the RAM 24. However, if the C', M', Y', or K' value is 12 bits (S8; YES), then the CPU 22 skips S9 and jumps to S10.

Since K values are not converted to a larger bit width in the calibration process in the illustrative aspects, the K' value is always 8 bits after the calibration process. Hence, when the CPU 22 performs the calibration process of S7 for a K value, the determination in S8 is always no. In S9 a bit width of a K' value is increased from 8 bits to 12 bits by a simple calculation. That is, a bit width of a K' value is increased from 8 bits to 12 bits by simply multiplying the K' value by 16.

In S11 the CPU 22 determines whether the n address of the address pointer is the final address. If the n address is the final address (S11: YES), indicating that processing has been completed for all values of a single color component stored in the PC print data memory 24b, then in S12 the CPU 22 determines whether the specified color component is a C value, that is, whether the specification data stored in the PC specified color memory 24c is the C specification data. If the specified color component is not the C value (S12: NO), then the specified color component is one of the M value, Y value, or K value.

This PC color conversion process is executed for all CMYK values in the order C values, M values, Y values, and K values. Hence, a positive confirmation in S12 indicates that the process has been completed up to this color component. Therefore, if the specified color component is not the C value in S12, then the process has been completed at least up to the M values. Accordingly, in S13 the CPU 22 determines whether the specified color component is the M value, that is, whether the specification data stored in the PC specified color memory 24c is the M specification data. If the specified color component is not the M value (S13: NO), then the specified color component is either the Y value or the K value, indicating that the process has been completed at least up to the Y values. Therefore, in S14 the CPU 22 determines whether the specified color component is the Y value, that is, whether the specification data stored in the PC specified color memory 24c is the Y specification data. If the specified color component is not the Y value (S14: NO), then the specified color component is the K value, indicating that the process has been completed up to the K values in the order C values, M values, Y values, and K values. Hence, in S15 the CPU 22 executes a 12-bit error diffusion process on the generated C', M', Y', and K' values, creates multilevel data, and writes the multilevel data to the PC print data memory 24b. After completing S15, the PC color conversion process ends.

However, if the CPU 22 determines in S11 that the n address is not the final address (S11: NO), indicating that the process has not been completed for all values of the current color component stored in the PC print data memory 24b, then in S19 the CPU 22 increments the value of the address pointer (n) by 1 (n=n+1) to specify the next address, and returns to the process in S6.

Further, if the CPU 22 determines in S12 that the specified color component is the C value (S12: YES), indicating that the process has been completed for the C values and that it is time to begin processing the M values, then in S16 the CPU 22 writes the M specification data specifying the M value to the PC specified color memory 24c and returns to S5. In this way, the value of the address pointer is reset to 0, and the specification data stored in the PC specified color memory 24c is changed to the M specification data. Hence, the CPU 22 reads the M value stored at the 0 address in the PC print data memory 24b in S6 and performs the calibration process on the M value in S7.

Further, if the CPU 22 determines in S13 that the specified color component is the M value (S13: YES), indicating that the process has been completed for all M values and that it is time to begin processing Y values, then in S17 the CPU 22 writes the Y specification data specifying the Y value to the PC specified color memory 24c and returns to S5. As a result, the CPU 22 reads the Y value stored at the 0 address in the PC print data memory 24b in S6 and performs the calibration process on the Y value in S7.

Further, if the CPU 22 determines in S14 that the specified color component is the Y value (S14: YES), indicating that the process has been completed for all Y values and that it is time to begin processing the K values, then in S18 the CPU 22 writes the K specification data specifying the K value to the PC specified color memory 24c and returns to S5. As a result, the CPU 22 reads the K value stored at the 0 address in the PC print data memory 24b and performs the calibration process on the K value in S7.

FIG. 6 is a flowchart illustrating steps in the calibration process of S7 executed during the PC color conversion process. The calibration process (S7) uses the first PC correction table 25c and second PC correction table 25d to perform tone correction suited to the destination printer 1. The process corrects the CMYK values converted from the RGB values in order to reflect the original tone indicated by these values in the printed image.

In S20 of the calibration process shown in FIG. 6, the CPU 22 determines whether the specification data stored in the PC specified color memory 24c is the K specification data. If the specification data is not the K specification data (S20: NO), then it may be possible to perform a process to expand the bit width. Hence, in S21 the CPU 22 reads a threshold value corresponding to the specification data stored in the PC specified color memory 24c from the PC threshold value memory 25e and in S22 determines whether the color component value read in S6 (one of the C, M, and Y values) is less than or equal to the threshold value. Here, if a K value is stored at the n address holding the color component value read in S6, then the CPU 22 determines in S22 whether the K value added to the color component value read in S6 (C, M, or Y value) is less than or equal to the threshold value. In other words, the existence of a K value indicates that this value compensates for a portion of the CMY density. When comparing the CMY value to the threshold value in such a case, it is possible that the bit width expanding process could be performed despite the CMY value forming a printed image of a high density that should not require such bit width expansion. Therefore, in the PC color conversion process of the illustrative aspects, the K value is added to the color component value compared with the threshold value. Further, the CPU 22 need not read the threshold value from the PC threshold value memory 25e each time the process of S21 is performed. In this case, the CPU 22 stores the threshold value in the RAM 24 after reading once, and reads the threshold value stored in the RAM 24 in S22.

If the CPU 22 determines in S22 that the color component value is less than or equal to the threshold value (S22: YES), then in S23 the CPU 22 references the second PC correction table 25d to extract 12-bit color component values (C'M'Y' values) corresponding to the color component values read in S6 (CMY values) in order to expand the bit width of these values. In this way, the 8-bit CMY values are converted to values of a greater bit width. By converting the 8-bit CMY values to 12-bit C'M'Y' values in this way, it is possible to increase the number of significant digits to increase the number of possible values in the C'M'Y' values (values forming tones), thereby making it possible to produce more tones than can be expressed with 8 bits. Hence, the CMY values can be corrected to C'M'Y' values for rendering the original tone on the printer 1 by implementing tone correction with values having a larger bit width. Subsequently, the calibration process of S7 ends.

However, if the CPU 22 determines in S20 that the specification data stored in the PC specified color memory 24c is the K specification data (S20: YES), or if the CPU 22 determines in S22 that the color component value read in S6 (one of the C, M, or Y values) exceeds the threshold value (S22: NO), then in S24 the CPU 22 references the first PC correction table 25c and extracts an 8-bit color component (C'M'Y'K' value) corresponding to the color component read in S6 (CMYK value) in order to generate an 8-bit color component value. In this way, the CPU 22 corrects the 8-bit C, M, Y, and K values to C, M', Y', and K' values for rendering the original tone on the printer 1. Subsequently, the calibration process of S7 ends.

After generating print data in the PC color conversion process described above, the personal computer 20 outputs the print data to the printer 1, and the printer 1 forms the printed image. In this way, the printer 1 can print an image with good reproducibility based on image data created on the personal computer 20, while suppressing tone jump, and can process the image at a high rate of speed since only a portion of the CMYK values is expanded to a larger number of bits.

Next, the printer color conversion process executed on the printer 1 will be described with reference to the flowcharts in FIGS. 7 and 8.

FIG. 7 is a flowchart illustrating steps in the printer color conversion process. This process begins when the user selects a print command on the control panel for printing image data stored in an external medium 40 mounted in the external media slot 10.

In S31 of the printer color conversion process in FIG. 7, the CPU 2 of the printer 1 sets the address pointer to 0 (n=0) to specify the top address of a file storing the image data to be printed. Addresses are assigned to image data files in the external medium 40 so that one set of RGB values is managed at one address. The top address is not necessarily 0.

In S32 the CPU 2 reads the RGB values stored at the n address in the specified image data file, loading the RGB files into the work area of the data RAM 5. In S33 the CPU 2 converts the RGB values to CMY values while referencing the printer look-up table 3c. In S34 the CPU 2 generates a K value corresponding to the converted CMY values based on the UCR curve (function) stored in the UCR curve 3f. In S35 the CPU 2 generates new CMY values by subtracting the K value from each of the CMY values converted in S33.

In S36 the CPU 2 writes the C specification data specifying the C value to the specified color memory 4b. In S37 the CPU 2 performs a calibration process on the CMYK values generated above through tone correction suited to the printer 1. In S38 the CPU 2 determines whether the CMYK value corrected in the calibration process, that is, the C'M'Y'K' value is 12 bits. If the corrected CMYK value is not 12 bits (S38: NO), then the generated C'M'Y'K' value is 8 bits. Accordingly, in S39 the CPU 2 converts the C'M'Y'K' value to 12 bits and in S40 writes the 12-bit C'M'Y'K' value to the work area of the data RAM 5. However, if the C'M'Y'K' value has been generated at 12 bits (S38: YES), then the CPU 2 skips S39 and advances to S40.

Since bit expansion is not performed on Y and K values in the calibration process in the illustrative aspects, the Y' and K' values are always 8 bits after the calibration process. Hence, when the calibration process is performed on the Y and K values in S37, the determination in S38 is always no. In S39 bit widths of Y' and K' values are increased from 8 bits to 12 bits by a simple calculation. That is, bit widths of Y' and K' values are increased from 8 bits to 12 bits by simply multiplying the Y' and K' values by 16.

In S41 the CPU 2 determines whether the specified color component value is a C value, that is, whether the specification data stored in the specified color memory 4b is the C specification data. If the specified color component value is not a C value (S41; NO), then the specified color component value is one of the M, Y, or K values.

The calibration process (S37) in the printer color conversion process is executed for CMYK values in the order of C values, M values, Y values, and K values. The specification data stored in the specified color memory 4b indicates that processing has been completed for the corresponding color component values after the calibration process of S37. Hence, if the CPU 2 determines in S41 that the specification data is not the C value, then the process has been completed through at least the M values. Accordingly, in S42 the CPU 2 determines whether the specified color component is an M value, that is, whether the specification data stored in the specified color memory 4b is the M specification data. If the specified color component is not the M value (S42: NO), then the specified color component is either the Y value or the K value and the process has been completed at least through the Y values. Hence, in S43 the CPU 2 determines whether the specified color component is the Y value, that is, whether the specification data stored in the specified color memory 4b is the Y specification data. If the specified color component is not the Y value (S43: NO), then the specified color component is the K value, indicating that processing has been completed up through the K values in the order of C values, M values, Y values, and K values. Therefore, in S44 the CPU 2 determines whether the n address indicated by the address pointer is the final address.

If the n address is the final address (S44: YES), indicating that color conversion has been completed for all RGB values in the specified image data, then in S45 the CPU 2 executes a 12-bit error diffusion process on the generated C', M', Y', and K' values to produce multilevel data, and writes this multilevel data to the print data memory 4a. After the CPU 2 completes the process in S45, the printer color conversion process ends.

However, if the CPU 2 determines in S44 that the n address is not the final address (S44: NO), indicating that color conversion has not been completed for all RGB values in the specified image data, then in S49 the CPU 2 increments the address pointer by 1 (n=n+1) to specify the nest address, and returns to S32. In this way, the process of S32-S49 is repeated until color conversion has been completed for all RGB values in the image data.

Further, if the CPU 2 determines in S41 that the specified color component is a C value (S41: YES), then the process has been completed for all C values and is about to begin for M values. Accordingly, in S46 the CPU 2 writes the M specification data specifying M values to the specified color memory 4b and returns to S37.

Further, if the CPU 2 determines in S42 that the specified color component is an M value (S42: YES), then the process has been completed for all M values and is about to begin for Y values. Accordingly, in S47 the CPU 2 writes the Y specification data specifying Y values to the specified color memory 4b and returns to S37.

Further, if the CPU 2 determines in S43 that the specified color component is a Y value (S43: YES), then the process has been completed for all Y values and is about to begin for K values. Accordingly, in S48 the CPU 2 writes the K specification data specifying K values to the specified color memory 4b and returns to S37.

FIG. 8 is a flowchart illustrating steps in the calibration process of S37 executed during the printer color conversion process. In the calibration process of S37, the CPU 2 performs tone correction suited to the printer 1 using the first printer correction table 3*d* and second printer correction table 3*e* in order to correct the CMYK values converted from RGB values to reflect the original tone indicated by the CMYK values in the printed image.

In S51 of the calibration process the CPU 2 determines whether the specification data stored in the specified color memory 4*b* is one of either C specification data or M specification data. If the specification data is either C specification data or M specification data (S51: YES), indicating a potential for performing a process to increase the bit width of the values, then in S52 the CPU 2 reads a threshold value corresponding to the specification data stored in the specified color memory 4*b* from the printer threshold value memory 3*g*. In S53 the CPU 2 determines whether the color component value specified in the CMY values generated in S33 (either the C value or M value) is less than or equal to the threshold value. If the color component value is less than or equal to the threshold value (S53: YES), then in S54 the CPU 2 references the second printer correction table 3*e* and extracts a 12-bit color component (C' value or M' value) corresponding to the color component value generated in S35 (C value or M value) in order to produce a C' value or M' value increased to a bit width of 12 bits. In this way, the CPU 2 can generate C' and M' color component values that have undergone tone correction suited to the printer 1. After the CPU 2 completes the process in S54, the calibration process ends.

The CPU 2 need not read the threshold value from the printer threshold value memory 3*g* each time the process of S52 is performed. In this case, the CPU 2 stores the threshold value in the RAM 4 after reading one time, and reads the threshold value stored in the RAM 4 in S52.

Here, new CMY values are generated in S35 by subtracting K values from the CMY values produced in S33. Since the CMY values generated in S35 appear to be smaller when compared with the threshold value, the process to increase bit width may be performed even for C and M values of a high density for which a large bit width is unnecessary. The printer color conversion process prevents the bit width process from being performed unnecessarily by comparing the CMY values (C and M values) generated in S33 with the threshold value.

However, if the CPU 2 determines in S51 that the specification data stored in the specified color memory 4*b* is neither the C specification data nor the M specification data (S51: NO) or if the CPU 2 determines in S53 that the specified color component value in the CMY value generated in S33 (the C or M value) exceeds the threshold value (S53: NO), then in S55 the CPU 2 references the first printer correction table 3*d* to extract an 8-bit color component value (C'M'Y'K' value) corresponding to the color component value generated in S35 (CMYK value). In this way, the CPU 2 generates a color component value (C'M'Y'K' value) that has undergone tone correction suited to the printer 1. Subsequently, the calibration process of S37 ends.

With this construction, the printer 1 performs a process to increase the bit number of color components that have undergone tone correction when the ink colors forming the printed image are cyan and magenta and when the density of the printed image is in the low-density range. Therefore, the printer 1 can print images with good reproducibility of the inputted image and can perform image formation at a high rate of speed.

The printer 1 and personal computer 20 are provided with the printer look-up table 3*c* and PC look-up table 25*b* for storing CMY values (CMYK values) corresponding to RGB values at 8 bits (less than or equal to a predetermined bit width). Using the printer look-up table 3*c* and PC look-up table 25*b*, the printer 1 and personal computer 20 perform color conversion to convert RGB values to 8-bit CMY values (CMYK values), without increasing the number of bits in the CMY values (CMYK values).

Obviously, it is possible to reduce rounding errors when converting from RGB values to CMY values by increasing the number of bits in these CMY values using a look-up table, as in conventional image formation, thereby suppressing tone jump in subsequent tone correction. However, increasing the bit width with a look-up table forces the printer 1 to process these larger CMY values in subsequent processes, thereby increasing the number of bits processed in the overall image process and leading to a drop in processing speed. Therefore, the printer 1 and personal computer 20 use the printer look-up table 3*c* and PC look-up table 25*b* to perform color conversion without increasing the bit width of the CMY values (CMYK values) in order to increase the image processing speed. Since deviations in hue have less effect on image quality than tone jump, there is no significant drop in the quality of the printed image by not increasing the bit width with the printer look-up table 3*c* and PC look-up table 25*b*.

As described above, the printer 1 and personal computer 20 perform a process to increase the bit width of color component values that have undergone tone correction in regions where tone jump is likely to cause a noticeable drop in image quality, that is, corrected CMY values for forming a printed image at a density less than or equal to a predetermined density. Therefore, the printer 1 can print images with high reproducibility of the inputted image and can increase the image processing speed.

While the invention has been described in detail with reference to the above aspects thereof, it would be apparent to those skilled in the art that various changes and modifications may be made therein without departing from the spirit of the invention.

For example, while each of the CMY (CMYK) color component values is obtained from the RGB values using the printer look-up table 3*c* and PC look-up table 25*b* in the illustrative aspects described above, CMY values can be generated from the RGB values using the equations C=255−R, M=255−G, and Y=255−B.

Further, while the external medium 40 is mounted in the external media slot 10 provided in the printer 1 in the illustrative aspects described above, image data from the external medium 40 may be inputted from a special external media reader via a separate input terminal.

Further, while a black color component is generated when the density of the printed image exceeds a predetermined density in the illustrative aspects, the black color component (like the CMY values) may be generated from a region in which the density of the printed image is approximately 0. In this case, a threshold value is provided for the K value, and a process is performed on the K color component after tone correction to increase the number of bits when the K value is less than or equal to the threshold value.

In the illustrative aspects described above, the region for increasing bit width in tone correction is based on the condition that the density of the printed image be less than or equal to a predetermined density. However, tone correction to increase the bit width may be executed within a range in which an amount of change of CMY values prior to correction is larger than a corresponding amount of change in C'M'Y' values after correction (in other words, within a range in which the C'M'Y' values are changed by an amount less than 1 in response to a change of 1 in the CMY values). Within this range, the bit width of color component values produced after tone correction is increased.

Further, the post-correction C'M'Y' values in the illustrative aspects are increased to a bit width of 12 bits. However, the bit width may be increased from 8 bits to 10 or 16 bits or any desired bit width between 8 and 16 bits. Further, it is possible to provide a plurality of threshold values for increasing the bit width toward the low density side, whereby the bit width is increased to 10 bits when the CMY values are less than or equal to a first threshold value, increased to 12 bits when the CMY values are less than or equal to a second threshold value smaller than the first threshold value, and to increase the bit width to 16 bits when the CMY values are less than or equal to a third threshold value smaller than the second threshold value.

In the illustrative aspects described above, only the printer 1 (not the personal computer 20) is configured to prevent an increase in bit width for Y values during the tone correction. However, the personal computer 20 may avoid increasing the bit width of Y values in order to further increase the image processing speed.

In the illustrative aspects described above, the bit width is increased in tone correction based on the condition that the density of the printed image is less than or equal to a predetermined density. Alternatively, however, it is possible to increase the bit width only for specific color component values (C and M values, for example). With this configuration, the bit width is increased for all values of the specific color component (cyan and magenta), while the bit width is not increased for color components other than the specific color components, thereby increasing the image processing speed. In addition, image processing can be simplified by omitting the step for determining whether to increase the number of bits in the CMY values based on a threshold value.

Further, while the printer 1 of the illustrative aspects described above is configured of an inkjet printer, the printer 1 is not limited to this type of printer. The printer 1 may be any common printer that performs color printing (performs printing with the CMY or CMYK color space), such as an electrophotographic printer or a thermal transfer printer.

Further, while the threshold value used to restrict an increase in bit width is set to 0.35 for all the C, M, and Y values in the illustrative aspects described above, a different threshold value may be set for each of the C, M, and Y values.

Further, in the illustrative aspects described above, the first printer correction table 3d and first PC correction table 25c store 8-bit C', M', Y', and K' values corresponding to the 8-bit C, M, Y, and K values. Alternatively, however, these tables may be configured to store only C'M'Y'K' values corresponding to representative CMYK values, while C'M'Y'K' values corresponding to CMYK values other than the representative values may be generated through any interpolation. Since the CMYK values corrected using the first printer correction table 3d and first PC correction table 25c belong to the high-density range, slight differences between the computed C'M'Y'K' values from the original values due to rounding errors and the like are not likely to produce a visually obvious difference. Therefore, the size of the first printer correction table 3d and first PC correction table 25c (memory volume) can be reduced without degrading image quality.

What is claimed is:

1. An image processing device comprising:
    a printing unit that prints an image based on print data, the printing unit having characteristics;
    an input-color-data storing portion that stores input color data indicative of colors of inputted image data, the input color data having color component values of a first color group, each of the color component values of the first color group indicating a color density;
    a print-data generating portion that converts the color component values of the first color group stored in the input-color-data storing portion into color component values of a second color group, thereby generating pre-correction print data representing a single pixel and having a predetermined bit width, each of the color component values of the second color group indicating a color density; and
    a correcting portion that converts the pre-correction print data representing the single pixel into post-correction print data representing the single pixel that is adapted to the characteristics of the printing unit,
    wherein the correcting portion comprises a bit-width correcting portion that generates the post-correction print data representing the single pixel and having a bit width greater than the predetermined bit width when the color component value of the pre-correction print data indicates a color density that is lower than or equal to a predetermined color density value.

2. The image processing device according to claim 1, wherein the bit-width correcting portion generates the post-correction print data representing the single pixel and having a bit width greater than the predetermined bit width when the color component values of the pre-correction print data fall within a predetermined range in which a color density is lower than or equal to the predetermined color density value.

3. The image processing device according to claim 2, wherein the correcting portion further comprises a first preventing portion that prevents the bit-width correcting portion from generating the post-correction print data having a bit width greater than the pre-correction print data when the color component values of the pre-correction print data are outside the predetermined range.

4. The image processing device according to claim 2, further comprising a conversion-information storing portion that stores conversion information for converting the color component values of the first color group to the color component values of the second color group, the conversion information including the color component values of the second color group in correspondence with the color component values of the first color group,
    wherein the print-data generating portion converts the color component values of the first color group into the color component values of the second color group based on the conversion information stored in the conversion-information storing portion.

5. The image processing device according to claim 4, wherein the conversion-information storing portion stores the color component values of the second color group having a bit width less than or equal to a bit width of the color component values of the first color group.

6. The image processing device according to claim 2,
    wherein the bit-width correcting portion performs correction for each of the color component values of the second color group; and
    wherein the bit-width correcting portion sets the predetermined range to a predetermined density range, the predetermined density range being defined for each color of the second color group, the predetermined density range for each color being less than or equal to a predetermined density value when the print data is actually printed with the printing unit.

7. The image processing device according to claim 2,
wherein the correcting portion further comprises a second preventing portion that prevents the bit-width correcting portion from generating the post-correction print data having a bit width greater than the pre-correction print data when the color component values of the pre-correction print data are specific color component values of the second color group, the specific color component values having a rate of density change that is smaller than a reference rate of change, the rate of density change being a rate of change in density with respect to the color component values when the print data is printed with the printing unit.

8. The image processing device according to claim 7, wherein the second color group includes at least cyan, magenta, and yellow; and wherein the specific color component values are color component values for yellow.

9. The image processing device according to claim 7, wherein the second color group includes at least cyan, magenta, yellow, light cyan, and light magenta; and wherein the specific color component values are color component values for yellow, light cyan, and light magenta.

10. The image processing device according to claim 2,
wherein the second color group includes color component values for at least cyan, magenta, yellow, and black;
wherein the print-data generating portion generates print data including black color component values when a minimum value among cyan, magenta, and yellow color component values is greater than or equal to a predetermined threshold value; and
wherein the correcting portion further comprises a third preventing portion that prevents the bit-width correcting portion from generating the post-correction print data having a bit width greater than the pre-correction print data when the color component values of the pre-correction print data are black color component values.

11. The image processing device according to claim 1, wherein the bit-width correction portion generates the post-correction print data representing the single pixel and having a bit width greater than the predetermined bit width when the color component values of the pre-correction print data are color component values in a predetermined color, the predetermined color including at least one color of the second color group.

12. The image processing device according to claim 11, wherein the correcting portion further comprises a fourth preventing portion that prevents the bit-width correcting portion from generating the post-correction print data having a bit width greater than the pre-correction print data when the color component values of the pre-correction print data are other than the color component values in the predetermined color.

13. The image processing device according to claim 1, wherein the correcting portion further comprises a halftone correcting portion that performs, by using an error diffusion method, halftone correction of the print data generated by the print-data generating portion.

14. A storage medium storing a set of program instructions executable on an image processing device, the set of program instructions comprising:
storing input color data indicative of colors of inputted image data, the input color data having color component values of a first color group, each of the color component values of the first color group indicating a color density;
converting the color component values of the first color group stored by the storing instructions into color component values of a second color group, thereby generating pre-correction print data representing a single pixel and having a predetermined bit width, each of the color component values of the second color group indicating a color density;
converting the pre-correction print data representing the single pixel into post-correction print data representing the single pixel that is adapted to characteristics of a printing unit; and
outputting the post-correction print data to the printing unit,
wherein the instructions for converting the pre-correction print data into post-correction print data comprise generating the post-correction data representing the single pixel and having a bit width greater than the predetermined bit width when the color component value of the pre-correction print data indicates a color density that is lower than or equal to a predetermined color density value.

15. The storage medium according to claim 14, wherein the instructions for generating the post-correction print data are performed when the color component values of the pre-correction print data fall within a predetermined range in which a color density is lower than or equal to the predetermined color density value.

16. The storage medium according to claim 15, wherein the instructions for converting the pre-correction print data into post-correction print data further comprise preventing the instructions for generating the post-correction print data from generating the post-correction print data having a bit width greater than the pre-correction print data when the color component values of the pre-correction print data are outside the predetermined range.

17. The storage medium according to claim 15, wherein the instructions for converting the color component values comprise converting the color component values of the first color group into the color component values of the second color group based on conversion information, the conversion information including the color component values of the second color group in correspondence with the color component values of the first color group.

18. The storage medium according to claim 15, wherein the instructions for converting the pre-correction print data into post-correction print data further comprise preventing the instructions for generating the post-correction print data from generating the post-correction print data having a bit width greater than the pre-correction print data when the color component values of the pre-correction print data are specific color component values of the second color group, the specific color component values having a rate of density change that is smaller than a reference rate of change, the rate of density change being a rate of change in density with respect to the color component values when the print data is printed with the printing unit.

19. The storage medium according to claim 15,
wherein the second color group includes color component values for at least cyan, magenta, yellow, and black;
wherein the instructions for converting the color component values comprise generating print data including black color component values when a minimum value among cyan, magenta, and yellow color component values is greater than or equal to a predetermined value; and
wherein the instructions for converting the pre-correction print data into post-correction print data further comprise preventing the instructions for generating the post-correction print data from generating the post-correction print data having a bit width greater than the pre-correction print data when the color component values of the pre-correction print data are black color component values.

20. The storage medium according to claim 14, wherein the instructions for generating the post-correction print data are performed when the color component values of the pre-correction print data are color component values in a predetermined color, the predetermined color including at least one color of the second color group.

21. The storage medium according to claim 20, wherein the instructions for converting the pre-correction print data into post-correction print data further comprise preventing the instructions for generating the post-correction print data from generating the post-correction print data having a bit width greater than the pre-correction print data when the color component values of the pre-correction print data are other than the color component values in the predetermined color.

22. The storage medium according to claim 14, wherein the instructions for converting the pre-correction print data into post-correction print data further comprise performing, by using an error diffusion method, halftone correction of the print data generated by the instructions for converting the color component values.

23. An image processing device comprising:
   a printing unit that prints an image based on print data, the printing unit having characteristics;
   an input-color-data storing portion that stores input color data indicative of colors of inputted image data, the input color data having color component values of a first color group, each of the color component values of the first color group indicating a color density;
   a print-data generating portion that converts the color component values of the first color group stored in the input-color-data storing portion into color component values of a second color group, thereby generating pre-correction print data representing a single pixel and having a predetermined bit width, each of the color component values of the second color group indicating a color density; and
   a correcting portion that converts the pre-correction print data representing the single pixel into post-correction print data representing the single pixel that is adapted to the characteristics of the printing unit,
   wherein the correcting portion comprises a bit-width correcting portion that generates the post-correction print data representing the single pixel and having a bit width greater than the predetermined bit width, the bit-width correcting portion selectively increasing the bit width of the print data,
   wherein the predetermined criteria include whether the color component values of the pre-correction print data fall within a predetermined range indicating a color density,
   wherein the bit-width correcting portion performs correction for each of the color component values of the second color group; and
   wherein the bit-width correcting portion sets the predetermined range to a range indicating a color density, an amount of change in the color component values of the post-correction print data in the range being smaller than a corresponding amount of change in the color component values of the pre-correction print data.

* * * * *